(12) United States Patent
O'Callaghan

(10) Patent No.: US 9,920,396 B2
(45) Date of Patent: Mar. 20, 2018

(54) TOP-ENTRY FLASH VESSEL ARRANGEMENT

(71) Applicant: Outotec (Finland) Oy, Espoo (FI)

(72) Inventor: John O'Callaghan, Wendouree (AU)

(73) Assignee: Outotec (Finland) Oy, Espoo (FI)

( * ) Notice: Subject to any disclaimer, the term of this patent is extended or adjusted under 35 U.S.C. 154(b) by 166 days.

(21) Appl. No.: 14/653,238

(22) PCT Filed: Dec. 30, 2013

(86) PCT No.: PCT/FI2013/051210
§ 371 (c)(1),
(2) Date: Jun. 17, 2015

(87) PCT Pub. No.: WO2014/106683
PCT Pub. Date: Jul. 10, 2014

(65) Prior Publication Data
US 2015/0329933 A1    Nov. 19, 2015

(30) Foreign Application Priority Data

Dec. 28, 2012 (FI) ..................... 20126388

(51) Int. Cl.
| | |
|---|---|
| C22B 3/02 | (2006.01) |
| B01J 3/04 | (2006.01) |
| C02F 1/06 | (2006.01) |
| C22B 3/04 | (2006.01) |
| C22B 3/06 | (2006.01) |
| B01J 3/02 | (2006.01) |

(52) U.S. Cl.
CPC .................. C22B 3/06 (2013.01); B01J 3/02 (2013.01); B01J 3/04 (2013.01); C02F 1/06 (2013.01);
(Continued)

(58) Field of Classification Search
CPC ..... C22B 3/02; C22B 3/04; C22B 3/06; C02F 1/06; B01J 3/02; B01J 3/04
See application file for complete search history.

(56) References Cited

U.S. PATENT DOCUMENTS 4,366,121 A * 12/1982 Krijgsman ............... B01J 3/02
422/110
5,071,477 A * 12/1991 Thomas ................. C22B 11/08
423/29

FOREIGN PATENT DOCUMENTS

| CN | 86102096 A | 9/1986 |
|---|---|---|
| CN | 101671045 A | 3/2010 |

(Continued)

OTHER PUBLICATIONS

Search report from corresponding International Patent Application No. PCT/FI2013/051210, dated search report: Apr. 16, 2014, 5 pgs.
(Continued)

*Primary Examiner* — George Wyszomierski
*Assistant Examiner* — Tima M McGuthry Banks
(74) *Attorney, Agent, or Firm* — Chernoff Vilhauer LLP

(57) ABSTRACT

The present invention relates to a method and an arrangement for pressure and temperature let down of autoclave discharge slurry, in particular in pressure oxidation or high pressure acid leach of metal containing ore. The method of the invention comprises a step of providing autoclave vent gas obtained from the autoclave to the top-entry flash vessel for inducing overpressure to the top-entry flash vessel and preventing boiling of the slurry during the transfer to next top-entry flash vessel. The invention further relates to an autoclave and pressure let-down arrangement adapted for providing autoclave vent gas to one or more top-entry flash vessels.

8 Claims, 2 Drawing Sheets

(52) U.S. Cl.
CPC .................. *C22B 3/02* (2013.01); *C22B 3/04* (2013.01); *Y02P 10/234* (2015.11)

(56) References Cited

FOREIGN PATENT DOCUMENTS

| | | | | |
|---|---|---|---|---|
| CN | 101899567 A | 12/2010 | | |
| CN | 102671403 A | 9/2012 | | |
| EP | 0 253 570 A3 | 1/1988 | | |
| EP | 0253570 A2 * | 1/1988 | ................ | B01J 3/02 |
| JP | 2010059489 A | 3/2010 | | |
| WO | WO-2005066378 A1 * | 7/2005 | ............... | C22B 3/02 |
| WO | 2014096550 A1 | 6/2014 | | |

OTHER PUBLICATIONS

Extended European Search Report issued by the European Patent Office for EP 13870246.9; dated Aug. 31, 2016, 6 pages.

Office Action issued by the State Intellectual Property Office of the People's Republic of China for CN 201380070504.4, dated May 3, 2016, 9 pages.

Search Report prepared by the Chilean Patent Office for CL 201501827, dated Sep. 29, 2017, 8 pages.

Second Office Action prepared by the State Intellectual Property Office of the People's Republic of China for CN201380070504.4. dated Oct. 28, 2016, 14 pages.

Translated by Kaihong, Zhu et al., "Product & Process Design Principles, Synthesis; Analysis and Evaluation," East China University of Science and Technology Press, May 31, 2006, 2 pages.

* cited by examiner

TOP-ENTRY FLASH VESSEL ARRANGEMENT

CROSS-REFERENCE TO RELATED APPLICATIONS

This is a national stage application filed under 35 USC 371 based on International Application No. PCT/FI2013/051210 filed Dec. 30, 2013 and claims priority under 35 USC 119 of Finnish Patent Application No. 20126388 filed Dec. 28, 2012.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

FIELD OF THE INVENTION

The present invention relates to a method and an arrangement for pressure and temperature let down of autoclave discharge slurry, in particular in pressure oxidation or high pressure acid leach of metal containing ore.

BACKGROUND OF THE INVENTION

In extractive metallurgy autoclaves are used for allowing increased operating temperature in the autoclave. Once an ore or concentrate is leached the discharge of the autoclave is often reduced in temperature and pressure by allowing the autoclave discharge slurry to flash i.e. convert the heat of the slurry at high temperature into a flash steam. To reduce capital cost in base metal autoclave operations the number of flash stages is minimised. However the pressure drop per flash stage is commonly high and the flashing slurry discharges into the flash tank at high velocity. Typically top-entry flash vessel design is used allowing the high pressure and high velocity flashing slurry to discharge into a slurry pool to absorb the kinetic energy of the slurry. This avoids excessive wear in the flash vessel that would occur if a bottom-entry design (used in alumina industry) were to be used.

The slurry flowing from one flash vessel to another flash vessel is at the boiling point of the slurry leaving the upstream vessel and if a pressure drop occurs in the pipeline interconnecting the two flash vessels then the slurry will boil and as steam is generated three-phase flow will occur. Since the volume of the steam is much greater that the equivalent volume of the liquid water, the velocity of the three-phase mixture increases substantially. This increased velocity will lead to excessive pipeline and valve wear.

Typically top-entry multi stage flash vessels are arranged staggered in height to ensure that three-phase flow is avoided in the pipeline connecting the two flash vessels to ensure no loss in pipeline pressure due to a change in static height. However elevating vessels is very expensive as the flash vessels are large and heavy pressure vessels that are brick lined vessels requiring substantial structural steel support and cost for their installation.

However, if top-entry flash vessels are constructed at the same level then a static height difference between the vessels will occur. This will lead to a pressure drop in the interconnecting pipeline and the slurry will boil leading to three phase flow at very high velocities and excessive wear.

To keep the flash vessels all at the same level and to avoid boiling in the pipeline between the flash vessels quench water is commonly used to sub-cool the slurry entering the pipeline in between the flash vessels.

Adding water injection facilities to a flash vessel is expensive and the operation of the circuit becomes more complicated in terms of operability. Furthermore, additional water is required, which may further impact the water balance of the system.

BRIEF SUMMARY OF THE INVENTION

An object of the present invention is thus to provide an improved method for pressure and temperature let-down of a pressure oxidation autoclave discharge slurry and an apparatus implementing the method so as to overcome the above problems, in particular to allow construction of flash vessel on the one level while not requiring the use of water. The method of the invention comprises a step of providing autoclave vent gas obtained from the autoclave to the top-entry flash vessel for inducing overpressure to the said top-entry flash vessel and preventing boiling of the slurry during the transfer to next top-entry flash vessel. The invention further relates to an autoclave and pressure let-down arrangement adapted for providing autoclave vent gas to one or more top-entry flash vessels. The objects of the invention are achieved by a method and an arrangement which is characterized by what is stated in the independent claims. Preferred embodiments of the invention are disclosed in the dependent claims.

BRIEF DESCRIPTION OF THE SEVERAL VIEWS OF THE DRAWINGS

In the following the invention will be described in greater detail by means of preferred embodiments with reference to the attached drawings, in which.

DETAILED DESCRIPTION OF THE INVENTION

Figure 1:
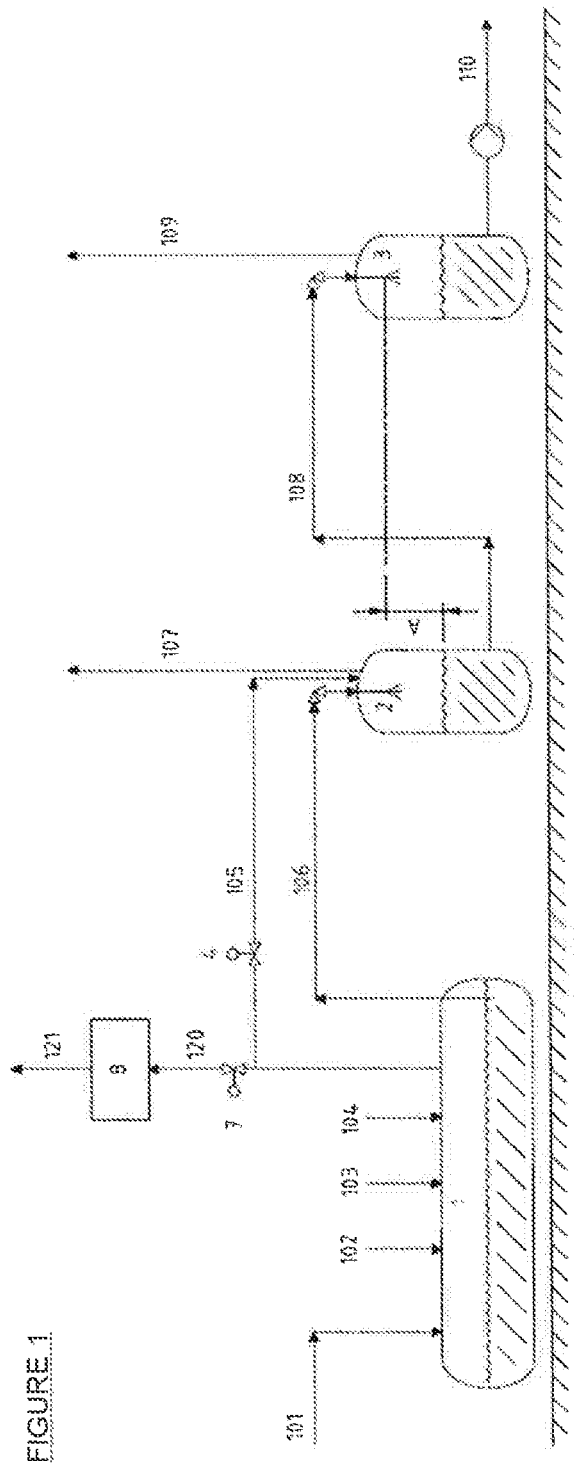
FIG. 1 shows a first pressure and temperature let-down arrangement illustrating a first embodiment of the invention.

The present invention relates to top-entry flash vessel design and operation as commonly applied pressure and temperature let-down of autoclave discharge slurry in the high pressure acid leach (HPAL) nickel industry and pressure oxidation industry (PoX), in particular in oxidation of sulphur in gold, copper and other base metal concentrates.

In particular the present invention relates to a method for pressure and temperature let-down of an autoclave discharge slurry comprising the steps of (a) receiving an autoclave discharge slurry from an autoclave to a first top-entry flash vessel; (b) obtaining a first flash steam and a first cooled slurry by allowing the autoclave discharge slurry to flash in the first top-entry flash vessel; (c) transferring the first cooled slurry from a bottom part of the first top-entry flash vessel to a top part of a second top-entry flash vessel; and (d) providing, simultaneously with the steps (b) and (c), autoclave vent gas obtained from the autoclave to the said first top-entry flash vessel for inducing overpressure to the first top-entry flash vessel and preventing boiling of the first cooled slurry during the transfer to the second top-entry flash vessel; and (e) obtaining a second flash steam and a second cooled slurry by allowing the first cooled slurry to flash in the second top-entry flash vessel.

When the pressure and temperature let-down flash vessel design further comprises a third flash vessel, the method may further comprise: (f) transferring the second cooled slurry from a bottom part of the second top-entry flash vessel to a top part of a third top-entry flash vessel; and (g) providing, simultaneously with steps (e) and (f), autoclave vent gas obtained from the autoclave to the said second top-entry flash for inducing overpressure to the second top-entry flash vessel and preventing boiling of the second cooled slurry during the transfer to the third top-entry flash vessel.

In accordance of the present invention the method may further comprise cooling the second or third cooled slurry in one or more further subsequent flash vessels by allowing the slurry obtained from a previous flash vessel to flash in a further top-entry flash vessel and thus obtaining a further flash steam and a further cooled slurry. If required for preventing the boiling of the transferring slurry, overpressure may be induced to any further top-entry flash vessel by providing autoclave vent gas obtained from the autoclave to said further top-entry flash vessel. Thus in accordance with the present invention, autoclave vent gas may be provided to any further flash vessel for inducing overpressure to the flash vessel and preventing boiling of the transferred cooled slurry during the transfer to the next flash vessel.

The method of the invention is particularly suitable for pressure and temperature let-down of pressure oxidation or high pressure acid leach autoclave discharge slurry. The autoclaves used for such operations typically operate at a temperature of 140 to 270° C. and this in accordance with the present invention the temperature of the incoming autoclave discharge slurry may preferably vary within this range. The operating pressure of such autoclave is typically between 1000 to 6000 kPa. The discharge slurry will be let-down in pressure and temperature until it reaches atmospheric pressure. In accordance with the present invention pressure drop of each flashing stage varies typically between 200 to 2000 kPa.

FIG. 1 shows a two stage pressure let-down arrangement arranged for temperature and pressure let down of pressure oxidation autoclave discharge slurry, comprising an autoclave 1 arranged for pressure oxidation or high pressure acid leaching of metal containing ore or concentrate; a first top-entry flash vessel 2 connected to the autoclave 1 for receiving autoclave discharge slurry from the said autoclave and arranged for converting the heat of the autoclave discharge slurry into a first flash steam and a first cooled slurry; a first vent gas pipeline 105 connected to the autoclave 1 for providing autoclave vent gas to the first top-entry flash vessel 2 for inducing overpressure to the first top-entry flash vessel and preventing boiling of the first cooled slurry during the transfer to the second top-entry flash vessel; a second top-entry flash vessel 3 connected to the first top-entry flash vessel 2 for receiving the first cooled slurry for the first top-entry flash vessel to the second top-entry flash vessel and arranged for converting the first cooled slurry to a second flash steam and a second cooled slurry.

Referring to FIG. 1 and in accordance with the invention the second top-entry flash vessel may be connected to the first top-entry flash vessel by a first slurry pipeline 108 arranged to interconnect the bottom part of the first top-entry flash vessel 2 and top part of the second top-entry flash vessel 3 for transferring the first cooled slurry from the first top-entry flash vessel to the second top-entry flash vessel. Thus the first top-entry flash vessel 2, having a higher pressure, discharges into the second top-entry flash vessel 3, having a lower pressure. However since the vessels are constructed at ground level a discharge static height will exist between the operating level of 2 and the fixed choke outlet of vessel 3. This discharge static height difference is shown as A in FIG. 1.

From the first flash vessel 2 and the second flash vessel 3 the corresponding flash steam is released via a steam lines 107 and 109, respectively. The flash steam may be discarded to the atmosphere and/or utilized elsewhere in the process. Prior to release to the atmosphere the steam may be cleaned in a gas scrubbing unit. Second cooled slurry may be recovered though slurry pipeline 110.

Utilization on the autoclave vent gas for preventing boiling and three phase flow of the transferred slurry in a slurry pipeline interconnecting two flash vessels allows that no cooling water or aqueous liquid is added to the flash arrangement for cooling of the slurry. Further with the arrangement of the invention where autoclave vent gas is directly provided to a flash vessel it may be possible to have an autoclave arrangement where a separate expensive ceramic line blast spool, typically required to let down the pressure from the autoclave vent, is not required.

Figure 2:
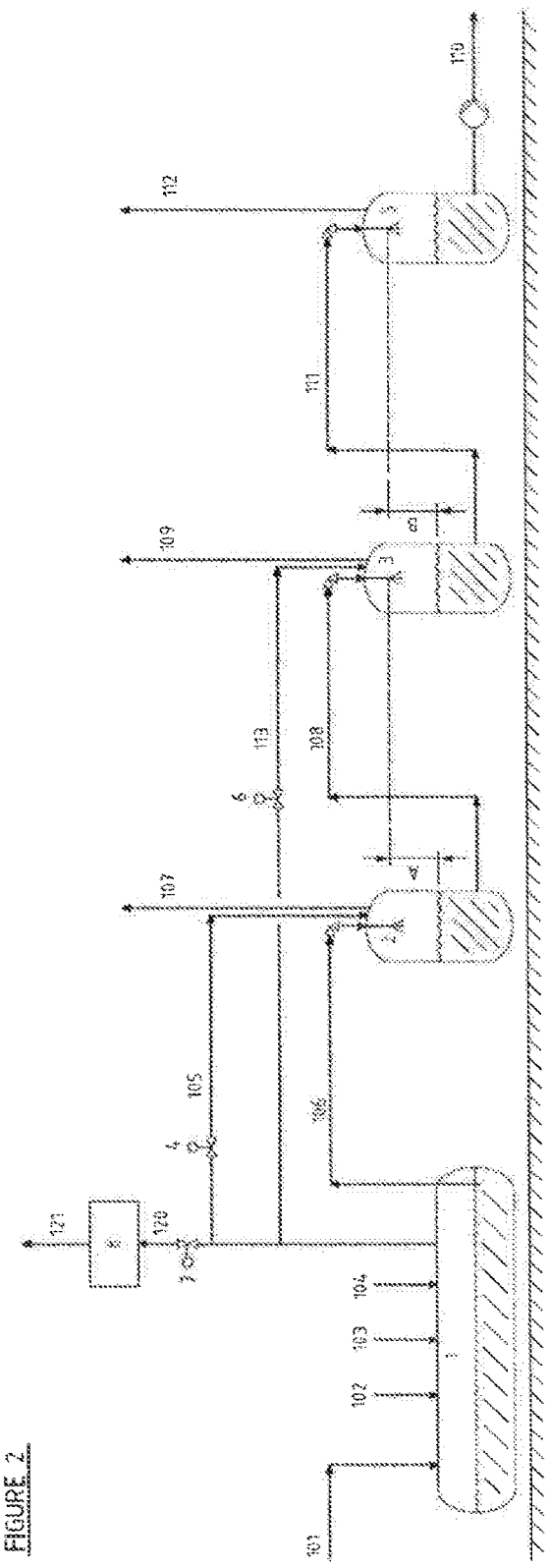
FIG. 2 shows a second pressure and temperature led-down arrangement illustrating a second embodiment of the invention.

As shown in FIG. 2 as a further embodiment of the invention, the arrangement may comprise a further flash vessel. In FIG. 2, like components are designated by the same reference numerals as used in FIG. 1.

In embodiment presented in FIG. 2, the arrangement further comprises a third top-entry flash vessel 5 connected to the second top-entry flash vessel 3 for receiving the second cooled slurry from the second top-entry flash vessel to the third top-entry flash vessel and arranged for converting the heat of the second cooled slurry into a third flash steam and a third cooled slurry; a second vent gas pipeline 113 connected to the autoclave 1 for providing autoclave vent gas to the second top-entry flash vessel 3 for inducing overpressure to the second top-entry flash vessel and for preventing boiling of the second cooled slurry during the transfer to the third top-entry flash vessel.

Referring to FIG. 2 and in accordance with the invention the third top-entry flash vessel 5 may be connected to the second top-entry flash vessel 3 by a first slurry pipeline 111 arranged to interconnect the bottom part of the second top-entry flash vessel 3 and top part of the third top-entry flash vessel 5 for transferring the second cooled slurry from the second top-entry flash vessel to the third top-entry flash vessel. Thus the second top-entry flash vessel 3, having a higher pressure, discharges into the third top-entry flash vessel 5, having a lower pressure. However since the vessels are constructed at ground level a discharge static height will exist between the operating level of 3 and the fixed choke outlet of vessel 5. This discharge static height difference is shown as B in FIG. 1. The static height may vary depending on the particular flash vessel arrangement; however it is typically between 3 to 5 m. As shown in FIGS. 1 and 2 the flash vessels of the arrangement of the invention are preferably installed at ground level and are aligned on substantially the same horizontal level i.e. they are not staggered one to another.

From the third flash vessel 5 the third flash steam is released via a steam line 112. The third vent steam may be discarded to the atmosphere and/or utilized elsewhere in the process. Prior to release to the atmosphere the steam may be cleaned in a gas scrubbing unit. The third cooled slurry may be recovered though slurry pipeline 110.

The amount of autoclave vent steam entering a top-entry flash vessel and subsequently the provided overpressure may be controlled by operating a vent valve. As shown in FIG. 1, a first vent valve 4 is arranged to the first vent gas pipeline 105 for controlling the pressure provided to the first top-entry flash vessel 2. Similarly, referring to FIG. 2, a second vent valve 6 is arranged to the second vent gas pipeline 113 for controlling the pressure provided to the second top-entry flash vessel 3.

Typically the overpressure provided to the flash vessel and required for preventing the boiling and three phase flow of the transferred slurry is 20 to 50 kPa. The required overpressure is dependent on the static height difference of the flash vessels and the temperature and composition of the slurry.

Any excess autoclave vent steam may be released from the system via an autoclave vent 7. The excess autoclave vent steam may be utilized elsewhere in the process or be discarded to the atmosphere via steam pipeline 120/121. Prior to release to the atmosphere the steam may be cleaned in a gas scrubbing unit 8.

If necessary, the arrangement may further comprise a supplementary inert gas pipeline for providing supplementary inert gas to a flash vessel for providing further overpressure to the said flash vessel. In an embodiment of the invention the arrangement comprises a first supplementary inert gas pipeline connected to the first top-entry flash vessel 2 for providing supplementary inert gas to the first to first top-entry flash vessel for providing further overpressure to the first flash vessel and for preventing boiling of the first cooled slurry during the transfer to the second top-entry flash vessel. In a further embodiment of the invention the arrangement comprises a second supplementary inert gas pipeline connected to the second top-entry flash vessel 3 for providing supplementary inert gas to the second to first top-entry flash vessel for providing further overpressure to the second flash vessel and for preventing boiling of the second cooled slurry during the transfer to the third top-entry flash vessel 5.

EXAMPLES

Example 1—Two Stage Flash System

The following example illustrates by estimation, with reference to FIG. 1, the overpressure required for preventing boiling and flashing of the transferring slurry in a two stage flashing circuit with two top-entry flash vessels 2 and 3. In the example a pyritic concentrate 101 is oxidized using oxygen 104 and cooled using quench water 103. Both flash vessels 2 and 3 are installed at the same level and are not elevated or staggered one to another. In this example the high pressure flash vessel 2 is operated to achieve a target steam temperature of 170° C. The high pressure flash vessel discharge static height (A) in this example is 3.5 m.

Stream 101:

Gold sulphide concentrate containing arsenopyrite/pyrite.
Temperature: 40° C.
Feed slurry 50% w/w slurried in fresh water
Feed solids composition 25% w/w sulphur
25% w/w iron
 7% w/w arsenic Autoclave 1

| | |
|---|---|
| Operating pressure: | 3600 kPa abs |
| Operating temperature: | 225° C. |
| Oxygen utilization: | 82% |

Oxygen 104

98% v/v $O_2$ (2% $N_2$)

| | |
|---|---|
| Temperature: | 20° C. |
| Flowrate | 8.3 tons per hour (tph) |

Quench Water 103

| | |
|---|---|
| Temperature | 15° C. |
| Flowrate | 87 tph |

Autoclave Slurry Discharge 106

| | |
|---|---|
| Temperature | 225° C. |
| Flowrate | 118 tph |
| Solids | 11.5 tph |
| Solution | 106.5 tph |

Flash Vessel 2 Discharge to Flash Vessel 3—Line 108

| | |
|---|---|
| Temperature | 170° C. |
| Flowrate | 107 tph |
| Solids | 11.5 tph |
| Solution | 95 tph |
| Slurry density | 10.8% w/w solids |
| Slurry density (at temperature) | 1040 kg/m3 |

$$\text{Overpressure required} = 3.5 \text{ m} \times 9.81 \times 1040$$
$$= 36 \text{ kPa}$$

Hence an overpressure of at least 36 kPa is required in 2 to ensure no flashing and boiling in line 108

High Pressure Flash 2

| | |
|---|---|
| Operating Temperature | 170° C. |
| Vapour pressure of solution at operating temperature | 783 kPa abs |
| Operating Pressure | 823 kPa abs |
| Design Overpressure | 40 kPa |
| Overpressure volume fraction | (40/823) × 100 = 4.8% v/v |

Hence only 2 to 5% v/v inerts is required to provide sufficient overpressure to avoid boiling and three phase flow in pipeline 108

Vent Gas (105) to High Pressure Flash Vessel (2)

| | |
|---|---|
| Temperature | 225° C. |
| Flowrate | 2.7 tph |
| Vent gas composition | |
| 70% v/v water | |
| 26% v/v $O_2$ | |
| 3% v/v $N_2$ | |
| with remainder being other inerts like $CO_2$. | |

High Pressure Flash Vent 107

| | |
|---|---|
| Temperature | 170° C. |
| Flowrate | 14.1 tph |
| Total pressure | 823 kPa abs |
| Gas composition: | |
| 97.8% v/v water | |
| 2.2% v/v inerts | |

Excess Autoclave Vent Gas 120

| | |
|---|---|
| Temperature | 225° C. |
| Flowrate | 1.2 tph |
| Vent gas composition: | |
| 70% v/v water | |
| 26% v/v $O_2$ | |
| 3% v/v $N_2$ | |
| with remainder being other inerts like $CO_2$. | |

Example 2—Three Stage Flash System

The following example illustrates by estimation, with reference to FIG. 2, the overpressure required for preventing boiling and flashing of the transferring slurry in a three stage flashing arrangement with flash vessels 2, 3 and 5 as illustrated in FIG. 2. In the example a pyritic concentrate 101 is oxidised using oxygen 104 and cooled using quench water 103. All flash vessels 2, 3 and 5 are installed at the same level and are not elevated or staggered one to another. In this example the high pressure flash vessel 2 is operated to achieve a target steam temperature of 200° C. and the medium pressure flash vessel 3 is targeted to operate at 170° C. The high pressure flash vessel is discharges into a medium pressure flash vessel 3. In this example the high pressure flash vessel discharge static height (A) is 3.5 m. The medium pressure flash vessel 3 discharges into a low pressure flash vessel 5. Medium pressure flash vessel is targeted to operate at 170° C. The high pressure flash vessel discharge static height (B) is 3.5 m.

Stream 101

| Gold sulphide concentrate containing arsenopyrite/pyrite. | |
|---|---|
| Temperature: | 40° C. |
| Feed slurry | 50% w/w slurried in fresh water |
| Feed solids composition | |
| 25% w/w sulphur | |
| 25% w/w iron | |
| 7% w/w arsenic | |

Autoclave 1

| | |
|---|---|
| Operating pressure: | 3600 kPa abs |
| Operating temperature: | 225° C. |
| Oxygen utilization: | 82% |

Oxygen (104)

| | |
|---|---|
| 98% v/v $O_2$ (2% $N_2$) | |
| Temperature: | 20° C. |
| Flowrate | 8.3 tph |

Quench Water 103

| | |
|---|---|
| Temperature | 15° C. |
| Flowrate | 87 tph |

Autoclave Slurry Discharge 106

| | |
|---|---|
| Temperature | 225° C. |
| Flowrate | 118 tph |
| Solids | 11.5 tph |
| Solution | 106.5 tph |

Flash Vessel 2 Discharge to Flash Vessel 3—Line 108

| | |
|---|---|
| Temperature | 200° C. |
| Flowrate | 112 tph |
| Solids | 11.5 tph |
| Solution | 101 tph |
| Slurry density | 10.2% w/w solids |
| Slurry density (at temperature) | 995 kg/m3 |

$$\text{Overpressure required} = 3.5 \text{ m} \times 9.81 \times 995$$
$$= 34 \text{ kPa}$$

Hence an overpressure of at least 34 kPa is required in 2 to ensure no flashing and boiling in line 108.

High Pressure Flash (2)

| | |
|---|---|
| Operating Temperature | 200° C. |
| Vapour pressure of solution at operating temperature | 1538 kPa abs |
| Operating Pressure | 1573 kPa abs |
| Design Overpressure | 35 kPa |
| Overpressure volume fraction | (35/1573) × 100 = 2.2% v/v |

Vent Gas 105 to High Pressure Flash 2

| | |
|---|---|
| Temperature | 225° C. |
| Flowrate | 0.53 tph |
| Vent gas composition | |
| 70% v/v water | |
| 26% v/v $O_2$ | |
| 3% v/v $N_2$ | |
| with rest other inerts like $CO_2$. | |

High Pressure Flash Vent (107)

| | |
|---|---|
| Temperature | 200° C. |
| Flowrate | 5.9 tph |
| Total pressure | 1538 kPa abs |
| Gas composition | |
| 97.8% v/v water | |
| 2.2% v/v inerts | |

Flash Vessel 3 Discharge to Flash Vessel 5—Line 111

| | |
|---|---|
| Temperature | 170° C. |
| Flowrate | 106.5 tph |
| Solids | 11.5 tph |
| Solution | 95.0 tph |
| Slurry density | 10.8% w/w solids |
| Slurry density (at temperature) | 1040 kg/m3 |

$$\text{Overpressure required} = 3.5 \text{ m} \times 9.81 \times 1040$$
$$= 36 \text{ kPa}$$

Hence an overpressure of at least 36 kPa is required in 3 to ensure no flashing and boiling in line 111.

Medium Pressure Flash 3

| | |
|---|---|
| Operating Temperature | 170° C. |
| Vapour Pressure of solution at operating temperature | 783 kPa abs |
| Operating Pressure | 823 kPa abs |
| Design Overpressure | 40 kPa |
| Overpressure volume fraction | (40/823) × 100 = 4.8% v/v |

Hence only 2 to 5% v/v inerts is required to provide sufficient overpressure to avoid boiling and three phase flow in pipeline 111.

Vent Gas 113 to Medium Pressure Flash 3

| | |
|---|---|
| Temperature | 225° C. |
| Flowrate | 1.4 tph |
| Vent gas composition | |
| 70% v/v water | |
| 26% v/v $O_2$ | |
| 3% v/v $N_2$ | |
| with rest other inerts like $CO_2$ | |

Medium Pressure Flash Vent 112

| | |
|---|---|
| Temperature | 170° C. |
| Flowrate | 7.2 tph |
| Total pressure | 823 kPa abs |
| Gas composition | |
| 95.2% v/v water | |
| 4.8% v/v inerts. | |

Excess Autoclave Vent Gas 120

| | |
|---|---|
| Temperature | 225° C. |
| Flowrate | 2.0 tph |
| Vent gas composition | |
| 70% v/v water | |
| 26% v/v $O_2$ | |
| 3% v/v $N_2$ | |
| with rest other inerts like $CO_2$ | |

It will be obvious to a person skilled in the art that, as the technology advances, the inventive concept can be implemented in various ways. The invention and its embodiments are not limited to the examples described above but may vary within the scope of the claims.

The invention claimed is:

1. A method for pressure and temperature let-down of a pressure oxidation autoclave discharge slurry, characterized in that the method comprises
    (a) receiving an autoclave discharge slurry from an autoclave to a first top-entry flash vessel;
    (b) obtaining a first flash steam and a first cooled slurry by allowing the autoclave discharge slurry to flash in the first top-entry flash vessel;
    (c) transferring the first cooled slurry from a bottom part of the first top-entry flash vessel to a top part of a second top-entry flash vessel; and
    (d) providing, simultaneously with the steps (b) and (c), autoclave vent gas obtained from the autoclave to the said first top-entry flash vessel for inducing overpressure to the first top-entry flash vessel and preventing boiling of the first cooled slurry during the transfer to the second top-entry flash vessel;
    (e) obtaining a second flash steam and a second cooled slurry by allowing the first cooled slurry to flash in the second top-entry flash vessel.

2. The method as claimed in claim 1, wherein step (b) additionally comprises providing supplementary inert gas to the said first flash vessel for providing further overpressure to the first flash vessel.

3. The method as claimed in claim 1, wherein the overpressure is 20 to 50 kPa.

4. The method as claimed in claim 1, wherein the first and second flash vessel are substantially at the same horizontal level.

5. The method as claimed in claim 1, wherein the method further comprises
    (f) transferring the second cooled slurry from a bottom part of the second top-entry flash vessel to a top part of a third top-entry flash vessel;
    (g) providing, simultaneously with steps (e) and (f), autoclave vent gas obtained from the autoclave to the said second top-entry flash for inducing overpressure to the second top-entry flash vessel and preventing boiling of the second cooled slurry during the transfer to the third top-entry flash vessel.

6. The method as claimed in claim 5, wherein the first, second and third flash vessel are aligned substantially on the same horizontal level.

7. The method as claimed in claim 1, wherein no cool water or aqueous liquid is injected to the flash system for preventing boiling of the slurry during transfer from one flash vessel to the next flash vessel.

8. The method as claimed in claim 1, wherein the pressure oxidation autoclave discharge slurry is obtained from an autoclave adapted for pressure oxidation or high pressure acid leach of metal containing ore.

* * * * *

UNITED STATES PATENT AND TRADEMARK OFFICE
CERTIFICATE OF CORRECTION

PATENT NO. : 9,920,396 B2
APPLICATION NO. : 14/653238
DATED : March 20, 2018
INVENTOR(S) : John O'Callaghan Page 1 of 1

It is certified that error appears in the above-identified patent and that said Letters Patent is hereby corrected as shown below:

In the Specification

Column 1, Line 66    "...the volume of the steam is much greater that the equivalent..." should be
-- ...the volume of the steam is much greater than the equivalent.... --

Column 2, Line 55    "...a second pressure and temperature led-down arrangement..." should be
-- ...a second pressure and temperature let-down arrangement... --

Column 4, Line 43    "In embodiment presented in FIG. 2, the arrangement..." should be
-- In an embodiment presented in FIG. 2, the arrangement... --

Column 7, Line 49    "The high pressure flash vessel is discharges into a..." should be -- The
high pressure flash vessel is discharged into a... --

Signed and Sealed this
Twenty-fourth Day of April, 2018

Andrei Iancu
*Director of the United States Patent and Trademark Office*